June 27, 1967 L. K. RUSSELL ETAL 3,327,525

SCRIBED AND NOTCHED PN-JUNCTION TRANSDUCERS

Filed Aug. 10, 1964

INVENTORS
LEWIS K. RUSSELL
WILHELM H. LEGAT
BY [signature]
AGENT

United States Patent Office 3,327,525

Patented June 27, 1967

3,327,525
SCRIBED AND NOTCHED PN-JUNCTION TRANSDUCERS

Lewis K. Russell, Livermore, and Wilhelm H. Legat, Woodside, Calif., assignors to Raytheon Company, Lexington, Mass., a corporation of Delaware Filed Aug. 10, 1964, Ser. No. 388,411
5 Claims. (Cl. 73—88.5)

ABSTRACT OF THE DISCLOSURE

This invention relates to a PN-junction semiconductor transducer having a notch and scribe line in opposite surfaces for localizing stresses resulting from pressures mechanically exerted laterally to a junction therein.

The present invention relates to semiconductor signal translating devices and methods of operation thereof and, more particularly, to semiconductor strain transducers.

This invention sets forth a semiconductor signal translating device of new and improved form and is predicated upon the discovery that non-uniform, concentrated, anisotropic stress on junctions can be detected and interpreted in terms of the current voltage or reactance characteristics of such junctions. These types of signal translating devices are described in co-pending applications, Ser. No. 261,065, filed Feb. 26, 1963 and Ser. No. 268,772, filed Mar. 28, 1963. Both of these applications have been assigned to the assignee of the instant application.

The term "junction" in respect to the present invention is defined as—a region of transition between semiconducting regions of different electrical properties, which definition was established by IRE standards in the October 1954 issue of the "Proceedings of the IRE."

In general, the invention comprises a body of semiconducting crystalline material having a junction therein, said material having both a scribed line adjacent a first side of said junction and an opposing notch adjacent the second side of said junction. The scribed line and the opposing notch provide means for producing a concentrated nonuniform anisotropic stress within a small region of the junction. The scribe and notch co-act to effect a much higher response than previous transducers, e.g. as high as 1.74 micro amps per dyne-centimeters. The scribe and notch also co-act to localize the aforementioned stress.

In one illustrative embodiment of this invention a scribed planar notched transducer comprises a high resistivity substrate (approximately 50 ohms centimeter) of single crystalline silicon about 20 by 120 by 8 mils. An opposite impurity type layer is produced on the substrate by any well known method such as diffusion. Ohmic contacts are maintained in electrical communication with the diffused layer and the substrate. A line is then scribed into the diffused layer with a diamond or similarly hard stylus across the 20 mil width of the chip. An opposing back notch is then cut into the substrate by a suitable process, e.g. electrochemical etching. The resulting device operates at frequencies between zero and 40 kc. (it also has DC sensitivity). Therefore, this device may be used in any piece of equipment where it is desired that mechanical force or pressure be converted into an electrical signal. Since the device has high sensitivity, only a small number of amplification steps are necessary to obtain a usable signal.

It is therefore an important object of the present invention to provide an improved semiconductor transducer having a higher response than previous transducers.

A further object of the invention is to provide means for producing dislocation loops in a region of a junction within a semiconductor transducer.

Yet another object of the present invention is to provide means for concentrating nonuniform anisotropic stress in a small region of a junction within a semiconductor transducer.

Other objects and advantages of the present invention will become apparent by consideration of the following description, taken in conjunction with the accompanying drawings, in which.

In a previous device utilizing the anisotropic strain effect, a semiconductor body having a PN-junction therein is disposed so that a stressing mechanism, such as a stylus, is applied to the body in such a manner that anisotropic stress is applied to a localized region of the junction, whereby changes in junction characteristics occur. These changes have been employed to, alternatively, rectify current flowing through said material or vary the net resistance of the material. These devices are more fully set forth in the previously mentioned co-pending application, Ser. No. 261,065.

Later embodiments of these devices achieved the desired stress concentration by notching the semiconductor element adjacent the PN-junction as set forth in the aforementioned, co-pending application, Ser. No. 268,772.

Figure 1:
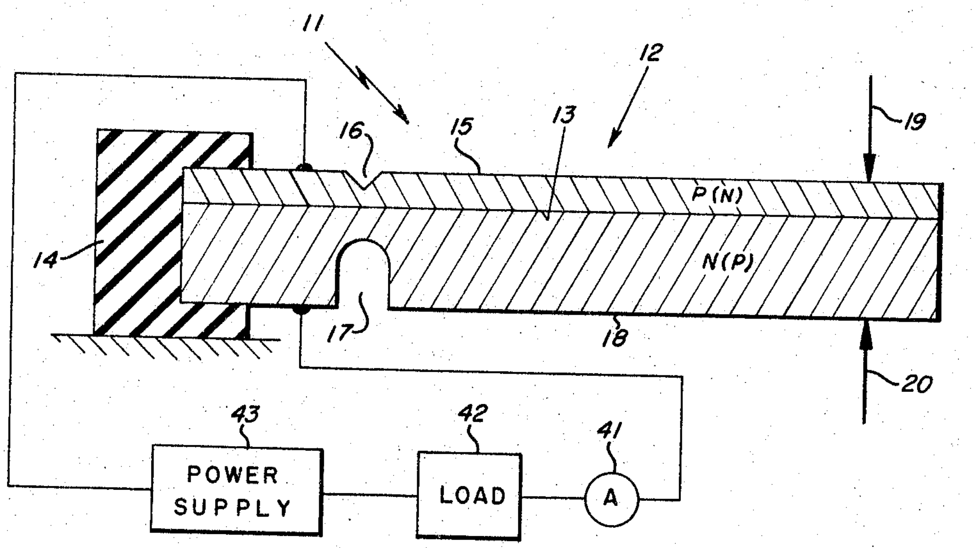
FIG. 1 shows a sectional view of a strain transducer according to this invention.

There is shown in FIG. 1 a cantilever-type strain transducer 11 comprising a body of semiconductor material 12 having a junction 13 therein, and held in a cantilevered position by support means 14. Semiconductor body 12, for example, could consist of silicon, germanium, gallium arsenide, or other materials such as the so-called group III–V or II–VI compounds. And, as more fully set forth in the previously mentioned co-pending applications, it is preferred that junction 13 lie within a depth of .00002 inch of a surface 15 of semiconductor body 12.

The major contribution of the instant invention resides in the fact that semiconductor body 12 has both a scribed line 16 in surface 15 and an opposing notched groove 17 in surface 18. This affords the previously mentioned high response and stress concentration. As previously mentioned, scribed line 16 may be formed by scribing with a diamond or similarly hard stylus. Opposing notch or groove 17 may be formed by electrochemical etching. The semiconductor device may be initially made by the method set forth in U.S. Patent No. 3,025,589 which issued to J. A. Hoerni on Mar. 20, 1962, entitled "Method of Manufacturing Semiconductor Devices." For example, one satisfactory device may be formed by diffusing a P-type impurity into an N-type silicon wafer. With an N-type silicon wafer, the impurity would be one of the known acceptor impurities, preferably alloyed with silicon. Application of sufficient heat to raise the wafer to an appropriate temperature results in a diffusion of the impurity into the wafer so as to produce a region or portion of P-type silicon within the wafer. Intermediate these two types of silicons now forming the wafer, there is produced the previously defined junction. As silicon technology is available in the literature, it is here only noted that N-type silicon may be formed by inclusion of an impurity chosen from group V of the periodic table while P-type silicon may be formed by inclusion of an impurity from group III.

The theory of operation of this invention, however, is not completely known. It is believed that scribed line 16 produces dislocation loops deep within junction 13 carrying generation-recombination centers with it. These dislocation loops in the crystalline lattice are prevented from collapsing (with increased temperature) by being pinned to the damaged surface created by scribed line 16. Under conditions of no bending moment the reverse characteristic of the diode is already degraded; that is, a generation current is superimposed over the normal diode reverse leakage current. In such a device, as shown in FIG. 1, when force is applied to the free unsupported end of body 12 along the direction of force arrow 19, notch 17 is narrowed. This causes the dislocation loops to collapse or be forced towards scribed line 16. This, in turn, pulls generation-recombination centers out of the depletion layer and decreases the generation current below its zero-stress value. When force is applied in the opposite direction along force line 20, notch 17 is widened which causes the dislocation loops to penetrate deeper into and toward the depletion layer carrying with them a greater number of generation-recombination centers. This serves to increase the generation current. This change in current is detected by ammeter 41 which is serially connected with load 42 and power supply 43 across strain transducer 11 as shown in FIG. 1.

Due to the coaction of scribed line 16 with notch 17, strain transducer 11 is operable without the need of a "prestress," i.e., it will show immediate response to extremely small forces in either bending direction. This is accomplished, in part, by deepening notch 17.

Figure 2:
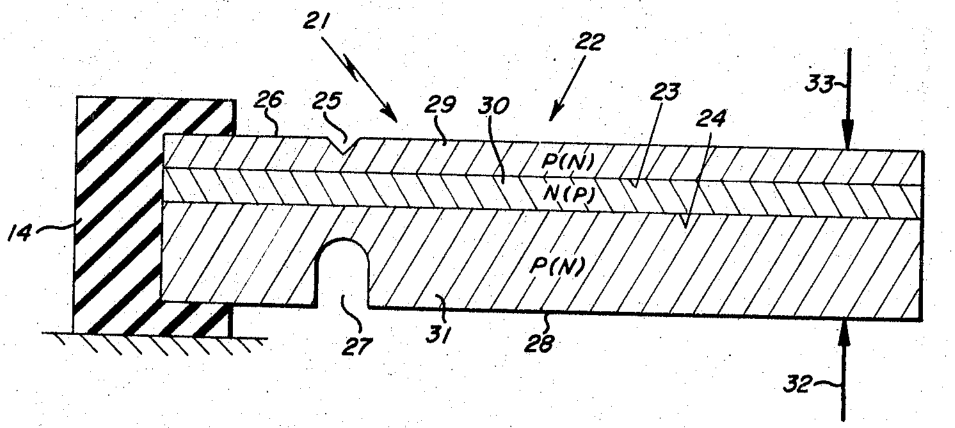
FIG. 2 illustrates a transistor device utilizing the present invention.

FIG. 2 illustrates a transistor transducer 21 utilizing the principles shown in FIG. 1. However, in this instance, semiconductor body 22 contains at least two junctions 23 and 24. Thus, for example, semiconductor body 22 may comprise alternate layers of N, P and N conductivity materials. Line 25 is scribed in surface 26 adjacent junction 23. Opposing notch 27 is etched in surface 28 proximate to junction 24. The device is maintained in a cantilevered position by means of support means 14. It is to be noted that the devices are shown in both FIGS. 1 and 2 to be supported in a cantilevered manner by way of illustration only. The present invention may be utilized in a variety of configurations without departing from the scope thereof.

Although the above description of the transistor structure has been referenced to an NPN transistor, it will be appreciated that it is equally applicable to PNP type transistors. An illustrative embodiment of an NPN transistor may be formed by diffusing a P-type impurity in an N-type silicon wafer as heretofore described. Thus, the acceptor impurity diffuses into the N-type silicon wafer to form a P-type base therein. In conventional manner there is produced through controlled heating and cooling of the transistor structure, a transistor junction between the base layer and the silicon wafer. There is then diffused into the transistor structure a second layer by the provision of a suitable impurity or alloy thereof atop the base layer and the addition of heat to raise the wafer and impurity upon same to diffusion temperature. In a conventional manner the diffusion of impurities into the wafer is precisely controlled as to rapidity and extent, so that there is thereby formed a second transistor junction between an emitter layer and the base layer. In a conventional manner there may then be applied ohmic contacts to the emitter, base and collector.

As shown in FIG. 2, one embodiment of transistor transducer 21 comprises an emitter 29, a base 30 and a collector 31. When operated in a grounded emitter configuration, the emitter base current is modulated by the anisotropic stress produced by application of force along force lines 32 or 33. This modulated current is multiplied by the device $\beta$ to produce large modulated emitter collector current.

It should be noted that many changes in the figures shown in the drawings and described in the specification may be made within the scope of the present invention. For example, while a single scribed line is shown, a plurality of relatively closely spaced parallel lines may be employed. Further, while planar geometry is preferred, to reduce surface leakage to a minimum, other configurations are possible. Accordingly, it is to be understood that the form of the present invention, is to be taken as a preferred example of the same and that various changes in the shape, size, material, constitution, and arrangement of parts may be resorted to without departing from the spirit of said invention or the scope of the subjoined claims.

What is claimed is:

1. A semiconductor strain transducer comprising:

(a) a body of semiconductor material having first and second regions of opposite conductivity-type defining a junction therebetween, (b) means for localizing stress in the body in a zone through which said junction extends comprising a scribed mark in said first region and an opposing notch in the second region, (c) means for restraining motion of a portion of the body at one side of the notch and mark, and means for applying varied pressures, in a direction lateral to the plane of the junction, to the unrestrained portion of the body on the other side of the notch and mark for causing a bending movement about said zone of the body between the scribed mark and opposing notch and thereby inducing strains in the portion of the junction lying within said zone in proportion to variations in applied pressure.

(d) and circuit means interconnecting said regions and including means for producing a current flow through the body and across the junction, and means for measuring modulations in the current flow resulting from strains induced in the junction.

2. The device of claim 1 wherein said body is composed of silicon.

3. The device of claim 1 wherein said body is composed of germanium.

4. The device of claim 1 wherein said body is composed of gallium arsenide.

5. A semiconductor strain transducer comprising:

(a) a body of semiconductor material having top, intermediate and bottom regions of alternate conductivity-type defining spaced first and second junctions between opposite surfaces of said body, (b) means for localizing stress in the body in a zone through which said junctions extend comprising a scribed mark in said top region and an opposing notch in the bottom region, (c) means for restraining motion of a portion of the body at one side of the notch and mark, and means for applying varied pressures, in a direction lateral to the plane of at least one of said junctions, to the unrestrained portion of the body on the other side of the notch and mark for causing a bending movement about said zone of the body between the scribed mark and opposing notch and thereby inducing strains in the portions of the junctions lying within said zone in proportion to variations in applied pressure, (d) and circuit means interconnecting said regions and including means for producing a current flow through the body and across the junctions, and means for measuring modulations in the current flow resulting from strains induced in the junctions.

References Cited

UNITED STATES PATENTS

| | | | |
|---|---|---|---|
| 2,744,970 | 5/1956 | Shockley | 317—234 |
| 2,993,998 | 7/1961 | Lehovec | 317—235 |
| 3,160,844 | 12/1964 | McLellan | 317—235 |
| 3,171,762 | 3/1965 | Rutz | 317—235 |
| 3,215,568 | 11/1965 | Pfann | 317—235 |
| 3,266,303 | 8/1966 | Pfann | 317—235 |

JAMES D. KALLAM, *Primary Examiner.*